United States Patent
Lohman et al.

(10) Patent No.: US 7,568,279 B2
(45) Date of Patent: Aug. 4, 2009

(54) SYSTEM AND METHOD OF INSTALLING AN INSTRUMENT PANEL

(75) Inventors: Keith Lohman, Brownstown, MI (US); Ajay Gupta, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 703 days.

(21) Appl. No.: 11/161,440

(22) Filed: Aug. 3, 2005

(65) Prior Publication Data

US 2007/0271758 A1  Nov. 29, 2007

(51) Int. Cl.
*B23Q 3/00* (2006.01)
*B23Q 15/00* (2006.01)

(52) U.S. Cl. .............................. 29/709; 29/464; 29/712; 29/281.5; 414/225.01

(58) Field of Classification Search .................... 29/464, 29/468, 709, 711, 712, 824, 281.5, 559; 296/70; 180/90; 414/225.01
See application file for complete search history.

(56) References Cited

U.S. PATENT DOCUMENTS

| | | | |
|---|---|---|---|
| 4,575,934 A * | 3/1986 | Kitamura et al. | 29/787 |
| 4,781,517 A | 11/1988 | Pearce et al. | |
| 4,876,786 A * | 10/1989 | Yamamoto et al. | 29/429 |
| 4,969,249 A * | 11/1990 | Yamamoto et al. | 29/429 |
| 5,082,078 A | 1/1992 | Umeda et al. | |
| 5,088,176 A | 2/1992 | Koga | |
| 5,311,659 A * | 5/1994 | Barnhart et al. | 29/823 |
| 5,351,384 A | 10/1994 | Barnhart et al. | |
| 5,456,002 A | 10/1995 | Barnhart et al. | |
| 5,477,603 A | 12/1995 | Kemichick | |
| 5,996,207 A * | 12/1999 | Brown et al. | 29/464 |
| 6,481,077 B1 | 11/2002 | Matsumoto et al. | |
| 6,517,139 B2 * | 2/2003 | Sutou et al. | 296/70 |
| 6,883,230 B2 * | 4/2005 | Matsumoto et al. | 29/822 |
| 6,895,647 B2 * | 5/2005 | Matsumoto et al. | 29/281.4 |
| 7,168,145 B2 * | 1/2007 | Sawada et al. | 29/423 |
| 2001/0005120 A1 | 6/2001 | Swanson et al. | |
| 2002/0138962 A1 | 10/2002 | Martin et al. | |
| 2002/0157234 A1 | 10/2002 | Sawada et al. | |

FOREIGN PATENT DOCUMENTS

JP  5-139350  6/1993

* cited by examiner

*Primary Examiner*—Essama Omgba
(74) *Attorney, Agent, or Firm*—Raymond Coppiellie; Brooks Kushman P.C.

(57) ABSTRACT

A system and a method of installing an instrument panel in a motor vehicle. The system includes a decking arm assembly having a support structure for supporting the instrument panel, an actuator, a cradle disposed proximate the actuator, and a sensor assembly. The cradle engages a steering shaft assembly of the instrument panel when the actuator is in the advanced position and the sensor assembly does not indicate that the instrument panel is in a desired installation position.

14 Claims, 7 Drawing Sheets

SYSTEM AND METHOD OF INSTALLING AN INSTRUMENT PANEL

BACKGROUND OF THE INVENTION

1. Field of the Invention

The present invention relates to a system and a method of installing a motor vehicle instrument panel.

2. Background Art

Motor vehicles may include an instrument panel having a steering shaft. Previously, steering shafts were difficult to install. For instance, operators had to lie down and hold the steering shaft in a desired location during installation. In addition, the operator may have to exert force to depress a brake pedal to permit the steering shaft to be maneuvered into position. Such assembly steps are undesirable from an ergonomics perspective.

SUMMARY OF THE INVENTION

In at least one embodiment of the present invention, a system for installing an instrument panel having a steering shaft assembly in a motor vehicle is provided. The system includes a decking arm assembly having a support structure, an actuator, a cradle, and a sensor assembly. The support structure is configured to support the instrument panel. The actuator is disposed proximate the support structure and is moveable between an advanced position and a retracted position. The cradle is disposed proximate the actuator for engaging the steering shaft assembly. The sensor assembly is disposed proximate the support structure for detecting the position of the decking arm assembly relative to the motor vehicle. The cradle engages the steering shaft assembly when the actuator is in the advanced position and the sensor assembly does not indicate that the instrument panel is in a desired installation position.

The system may include a carrier for holding the instrument panel. The carrier may have a fixture for supporting and positioning the steering shaft assembly in a predetermined location. The decking arm assembly may receive the instrument panel from the carrier.

In at least one other embodiment of the present invention, a method of installing an instrument panel in a motor vehicle is provided. The method includes providing an instrument panel having a steering shaft assembly, engaging the instrument panel with a decking arm assembly having a cradle and a sensor assembly, advancing the cradle to engage the steering shaft assembly, lifting and positioning the instrument panel inside the motor vehicle, moving the instrument panel forward in the motor vehicle until the sensor assembly indicates the instrument panel is in a desired installation position, retracting the cradle, and disengaging the decking arm assembly from the instrument panel.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
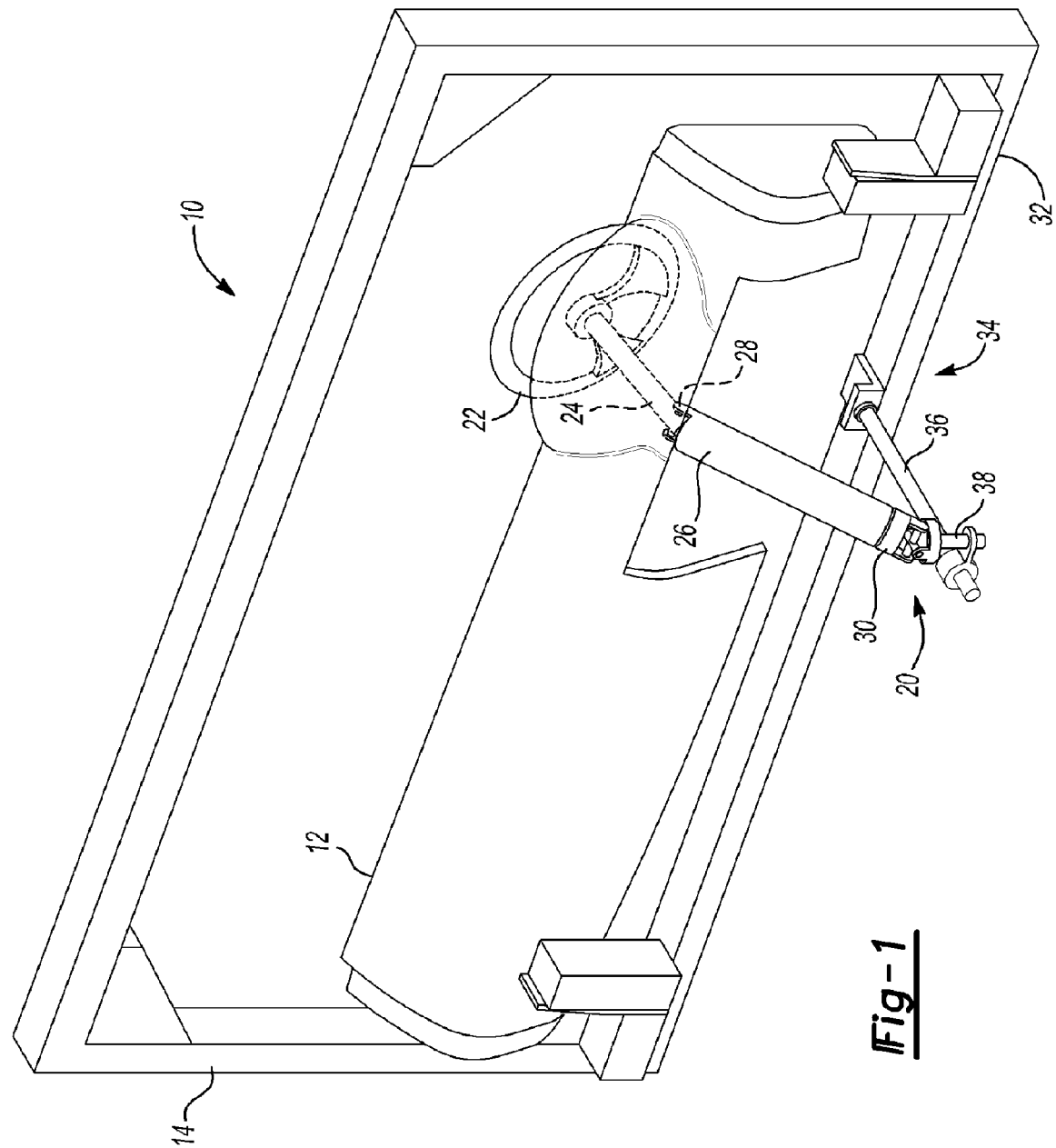
FIG. 1 is a perspective view of an instrument panel disposed on a carrier.
Figure 2:
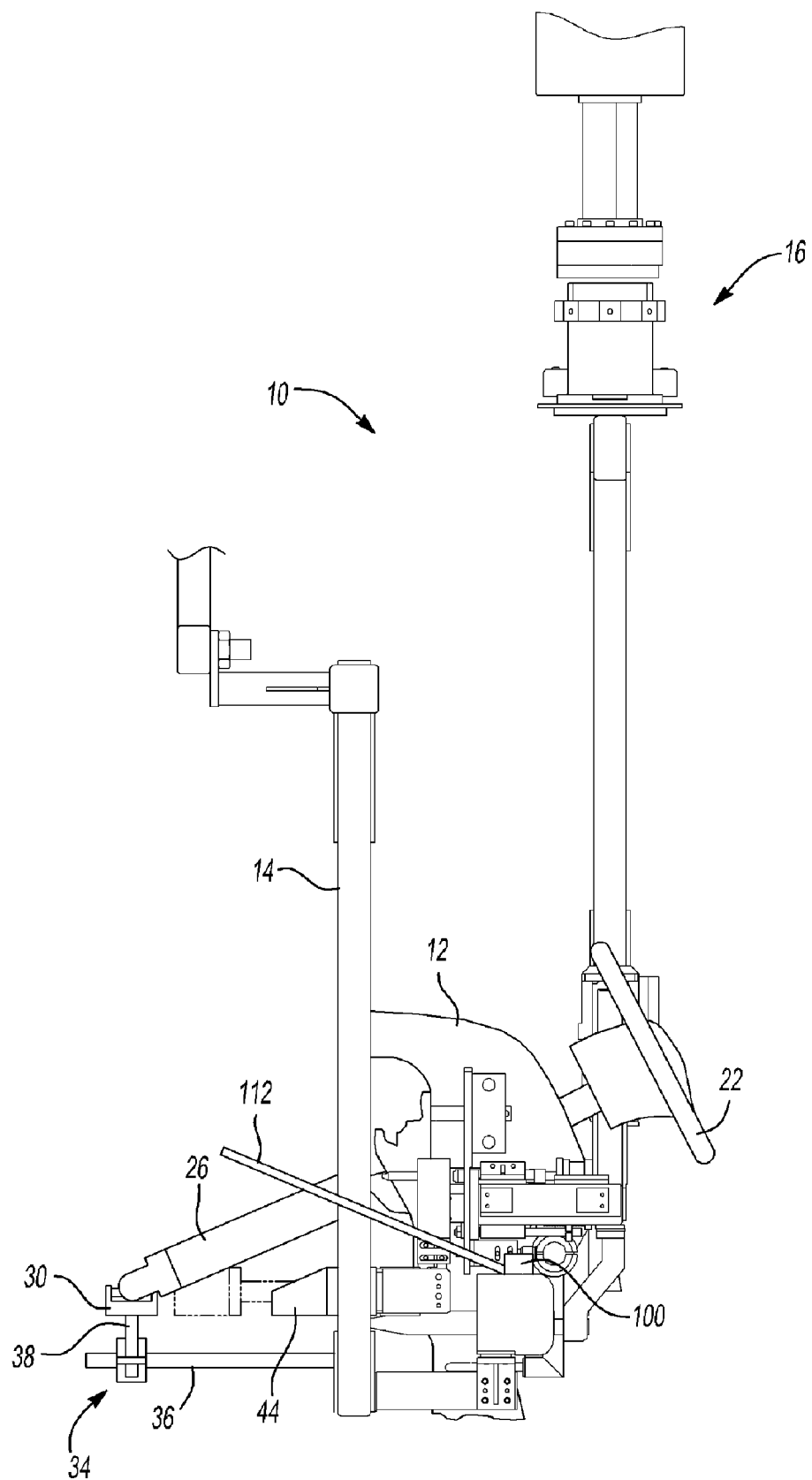
FIG. 2 is a side view of the instrument panel being transferred from the carrier to a decking arm assembly.

Referring to FIGS. 1 and 2, a system 10 for installing an instrument panel 12 in a motor vehicle is shown. The system includes a carrier 14 and a decking arm assembly 16.

The instrument panel 12 may have any suitable configuration. In the embodiment shown in FIGS. 1 and 2, the instrument panel 12 includes a steering shaft assembly 20.

The steering shaft assembly 20 is configured to connect a steering wheel 22 to a steering gear (not shown) and may include one or more shafts. As is best shown in FIG. 1, the steering shaft assembly 20 may include a first shaft 24 coupled to the steering wheel 22 and a second shaft 26, also called an intermediate or "I" shaft, coupled to the first shaft 24. The first and second shafts 24,26 may be coupled in any suitable manner, such as with a universal joint 28 that allows the second shaft 26 to pivot with respect to the first shaft 24. In addition, a second universal joint 30 may be disposed proximate an end of the second shaft 26 for coupling to the steering gear. The universal joints 28,30 may relieve mounting stresses, may reduce deflecting (bending) forces, and/or dampen shock and vibration transfer to the steering wheel 22.

In FIG. 1, the instrument panel 12 is shown disposed on the carrier 14. The carrier 14 may have any suitable configuration. In the embodiment shown in FIG. 1, the carrier includes a frame 32. The frame 32 may have any suitable configuration. In the embodiment shown, the frame 32 has a generally rectangular configuration and is configured to be mounted on a material transport system, such as an overhead conveyor system, that facilitates transportation of the instrument panel 12 to a desired location on a vehicle or instrument panel assembly line.

A fixture 34 may be provided on the carrier 14 for positioning the steering shaft assembly 20 in a predetermined location. The fixture 34 may have any suitable configuration. In the embodiment shown in FIG. 1, the fixture 34 is disposed on a lower cross member of the frame 32. In addition, the position of the fixture 34 may be adjustable to accommodate different Instrument panel configurations. In the embodiment shown, the fixture 34 includes a first portion 36 and a second portion 38.

The first portion 36 may have any suitable configuration. In the embodiment shown, the first portion 36 is configured as a rod that extends generally perpendicular to the frame 32.

The second portion 38 may also have any suitable configuration. In the embodiment shown, the second portion 38 is configured as a rod that extends generally perpendicular to the first portion 36. The second portion 38 may be coupled to the first portion 36 in any suitable manner. For example, the second portion 38 may be coupled to the first portion 36 with a fastener, such as a collar, that permits adjustment of the position of the second portion 38. The second portion 38 may be configured to receive or engage a portion of the steering shaft assembly 20, such as the second universal joint 30.

Figure 3:
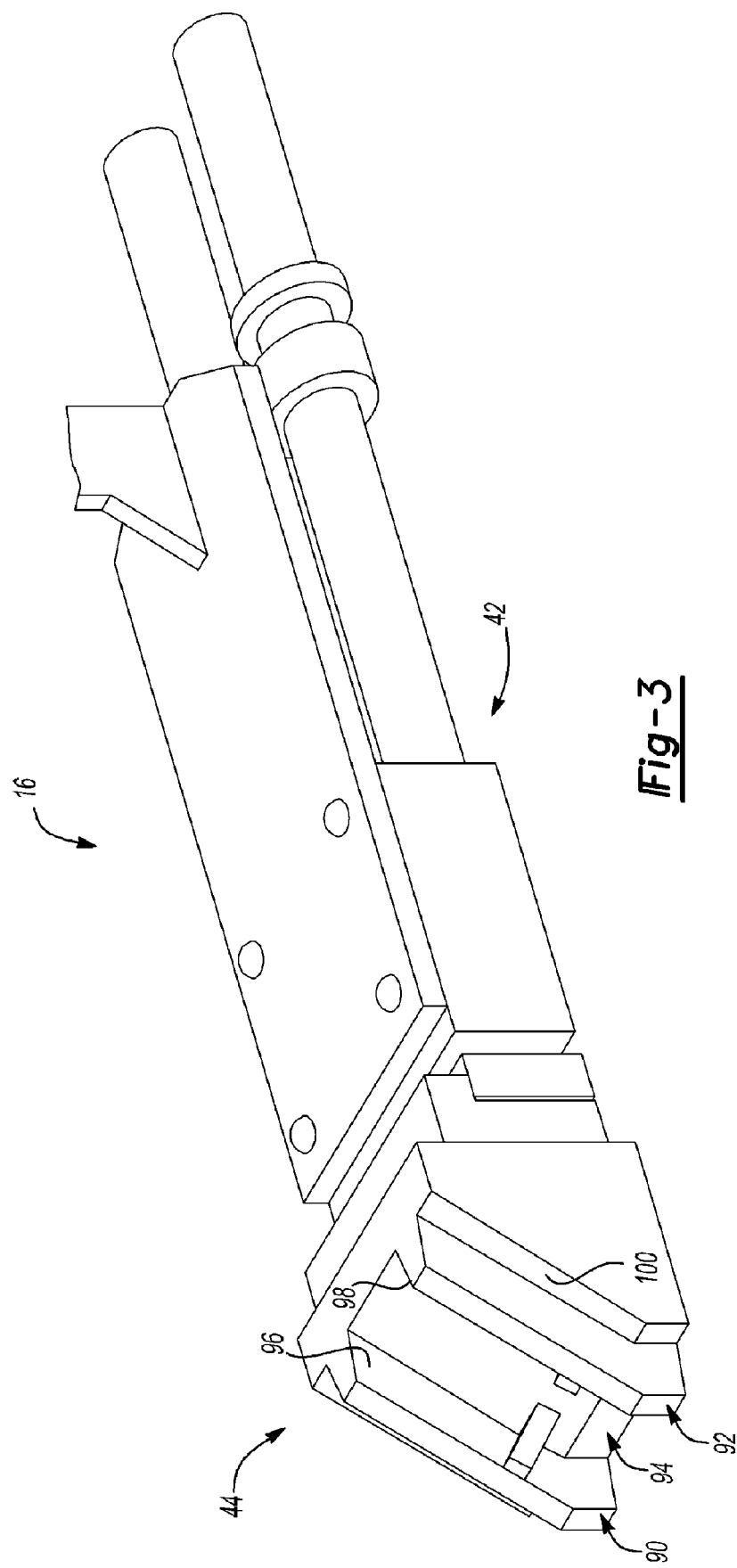
FIG. 3 is a magnified perspective view of an actuator and cradle of the decking arm assembly.
Figure 4:
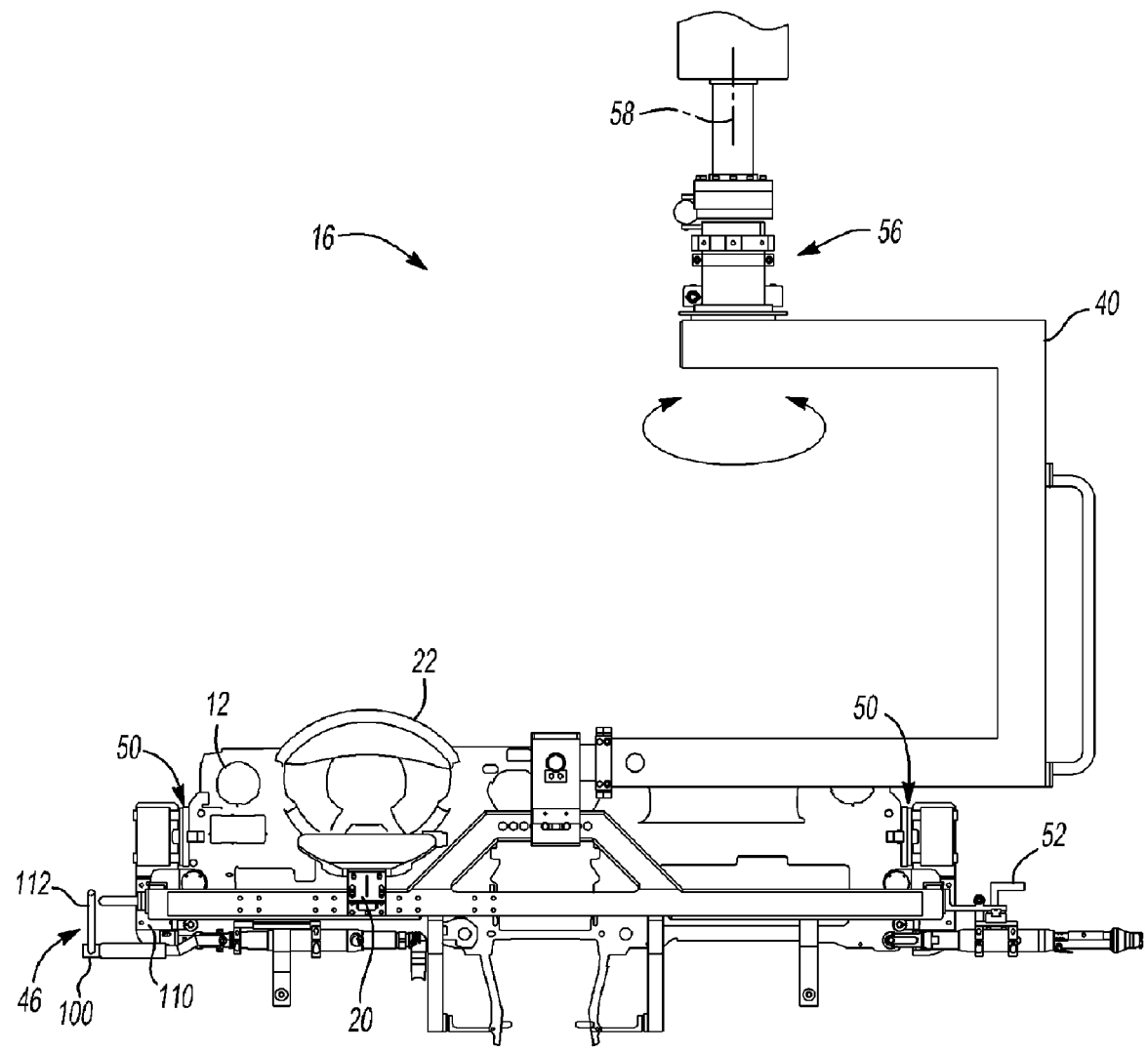
FIG. 4 is a front view of the decking arm assembly and the instrument panel.

Referring to FIG. 2-4, the decking arm assembly 16 is shown in more detail. The decking arm assembly 16 is configured to receive the instrument panel 12 from the carrier 14 and position the instrument panel 12 in the motor vehicle. The decking arm assembly 16 may have any suitable configuration. In the embodiment shown, the decking arm assembly 16 includes a support structure 40, an actuator 42, a cradle 44, and a sensor assembly 46.

The support structure 40 may have any suitable configuration. As is best shown in FIGS. 2 and 4, the support structure 40 may have a generally C-shaped configuration and may include a plurality of engagement features 50 for engaging, supporting, and/or securing the instrument panel 12. The engagement features 50 may include one or more clamps that may be actuated to engage and release the instrument panel 12. The support structure 40 may also include one or more hand controls 52 that permit manual operation of the engagement features 50 and facilitate positioning of the decking arm assembly 16 and installation of the instrument panel 12 as will be described in more detail below.

The support structure 40 may be mounted on a material transport system, such as an overhead conveyor system, that facilitates positioning of the instrument panel 12 in a motor vehicle 54. In addition, the support structure 40 may include a torque tube assembly 56 that permits the decking arm assembly 16 to be rotated about an axis 58 to facilitate installation of the instrument panel 12 in the vehicle 54.

Figure 5:
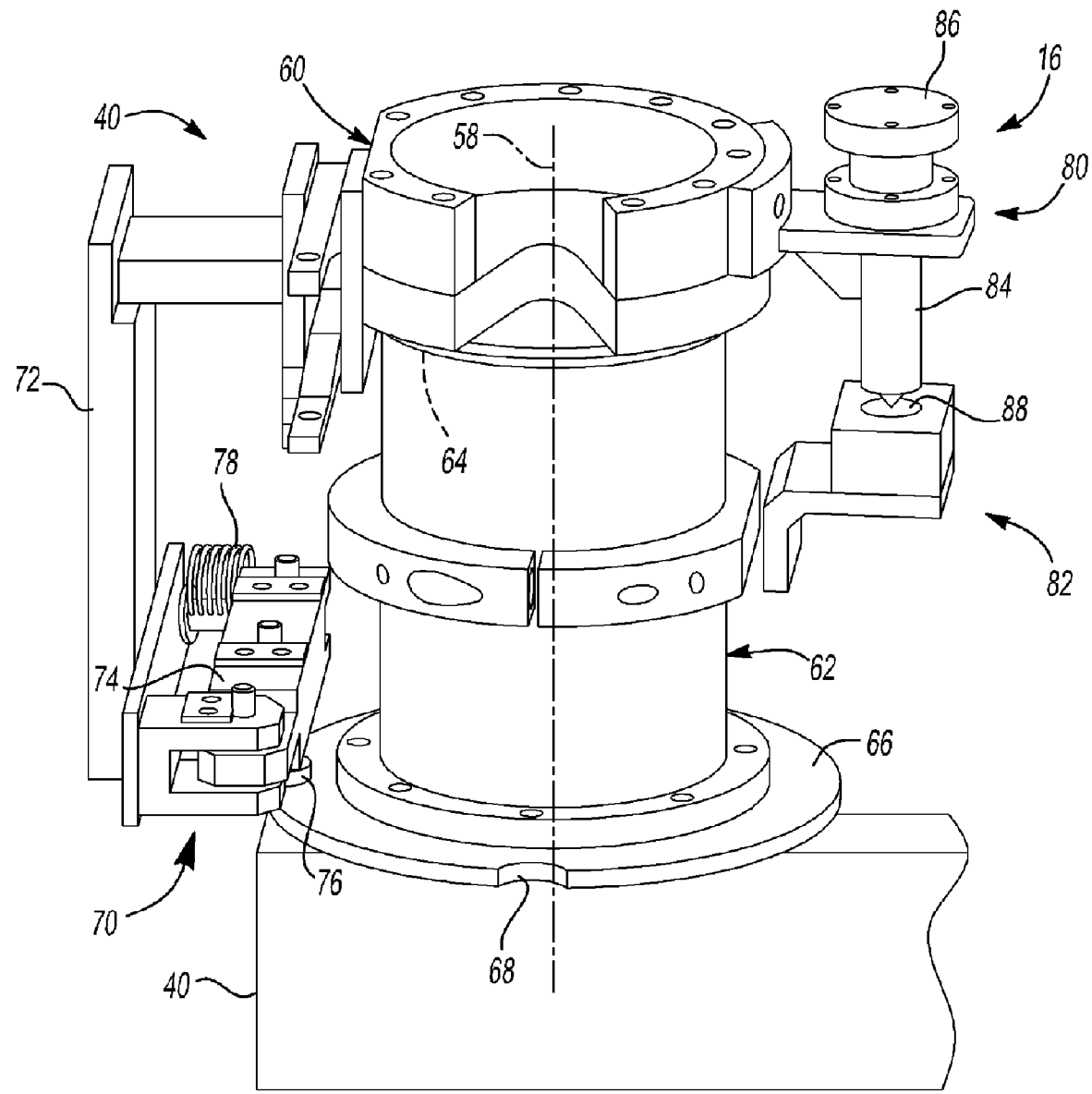
FIG. 5 is a magnified perspective view of a torque tube assembly of the decking arm assembly.
Figure 6:
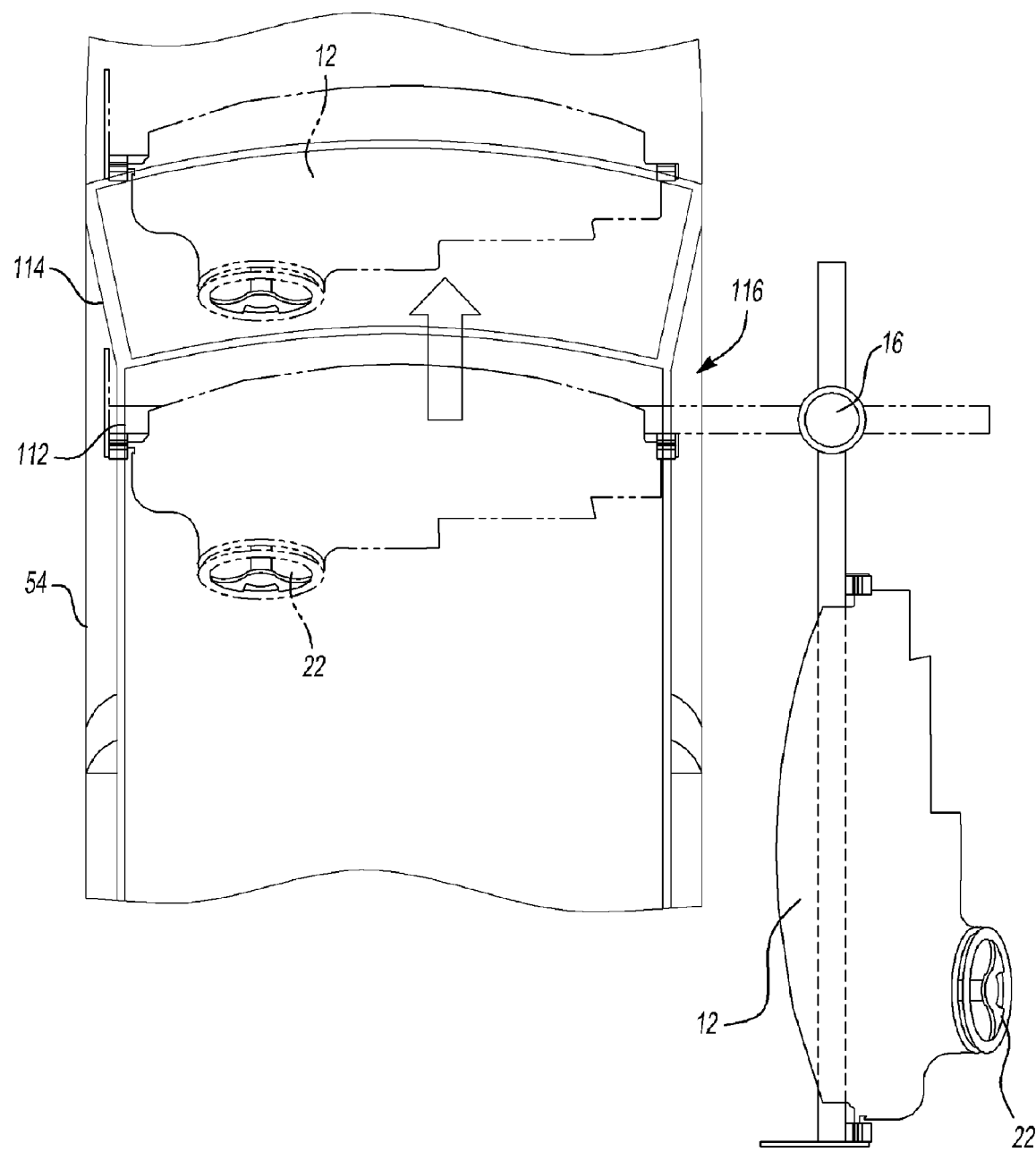
FIG. 6 is a plan view depicting installation of the instrument panel into the vehicle with the decking arm assembly.

Referring to FIG. 5, an exemplary torque tube assembly 56 is shown in more detail. The torque tube assembly 56 includes an upper tubular portion 60 and a lower tubular portion 62. The upper tubular portion 60 is configured not to rotate. The lower tubular portion 62 is rotatably coupled to the upper tubular portion 60 in any suitable manner, such as with a bearing 64. The lower tubular portion 62 includes a flange 66 having a detent opening 68 disposed on its circumference. A roller assembly 70 is attached to the upper tubular portion 60 by a bracket 72. The roller assembly 70 includes an arm 74, a roller 76, and a spring 78. The bracket 72 pivotally receives the arm 74. The roller 76 is rotatably disposed on the arm 74. The spring 78 biases the arm 74 and the roller 76 toward the flange 66. The roller 76 is configured to be seated in the detent opening 68 to help lock the support structure and inhibit rotation about the axis 58. The torque tube assembly 56 may also include a first coupling member 80 disposed on the upper tubular portion 60 and a second coupling member 82 disposed on the lower tubular portion 62. In the embodiment shown in FIG. 3, the first coupling member 80 includes a pin 84 and an actuator 86, such as a pneumatic cylinder. The pin 84 is configured to be selectively inserted into an aperture 88 in the second coupling member 82 when the roller 76 is disposed proximate the detent opening 68 to help inhibit rotation about the axis 58.

Referring to FIGS. 2-3, the actuator 42 is shown in more detail. The actuator 42 may be disposed proximate the support structure 40. The actuator 42 may be of any suitable type. For instance, the actuator 42 may be a pneumatic, hydraulic, electrical, mechanical, or combinations thereof. In the embodiment shown, the actuator 42 is configured as a pneumatic cylinder. The actuator 42 may be configured to move between a retracted position, as shown in solid lines in FIG. 2, and an advanced position as shown in phantom.

The cradle 44 may be disposed proximate the actuator 42 and may be adapted to engage the steering shaft assembly 20. The cradle 44 may have any suitable configuration. In the embodiment shown, the cradle 44 includes first and second protrusions or raised portions 90,92. The first and second raised portions 90,92 may cooperate to at least partially define a groove 94 configured to receive at least portion of the steering shaft assembly 20, such as the second shaft 26. The first and second raised portions 90,92 may be disposed generally parallel to each other and may include first and second surfaces 96,98, respectively.

The first and second raised portions 90,92 may have any suitable configuration. In the embodiment shown in FIG. 3, the first and second raised portions 90,92 may have generally trapezoidal configurations such that the first and second surfaces 96,98 are disposed along generally intercepting planes. Of course the present invention contemplates raised portions having any suitable configuration or cross-section, including, but not limited to triangular, rectangular, circular, curved, or combinations thereof. In addition, the first and second raised portions 90,92 may extend from a surface 100 that is disposed at an angle relative to a direction of travel of the actuator 42. In the embodiment shown in FIG. 3, the surface 100 is disposed at an angle of approximately 45 degrees from vertical.

The sensor assembly 46 may be disposed proximate the support structure 40 in any suitable location, such as proximate an end of the support structure 40. The sensor assembly 46 may include a switch 110 and an arm 112. The switch 110 may be of any suitable type, such as a contact switch or a non-contact switch like a proximity sensor. In at least one embodiment, the arm 112 may be attached to the switch 110 and may be configured to contact a portion of the vehicle 54, such as an A-pillar 114 during installation of the instrument panel 12. The arm 112 may be made of any suitable material, such as a polymeric material, and may be spring-mounted to permit the arm 112 to accommodate rough handling without breaking or damaging the switch 110.

Figure 7:
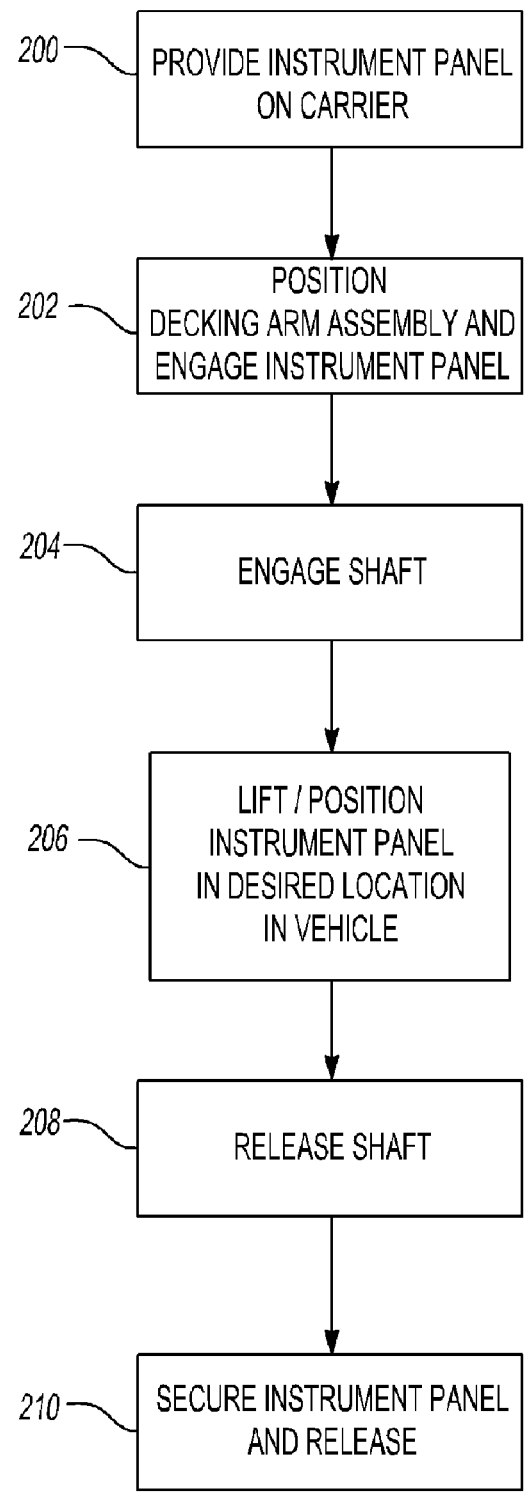
FIG. 7 is a flowchart of a method for installing an instrument panel in a motor vehicle.

Referring to FIG. 7, a flowchart of a method for installing an instrument panel in a motor vehicle is shown.

At 200, the method begins by providing the instrument panel 12 with the carrier 14 as previously described. The steering shaft assembly 20 may be disposed in a predetermined location by positioning a portion of the steering shaft assembly 20, such as universal joint 30, on the fixture 34.

At 202, the decking arm assembly 16 is positioned to receive the instrument panel 12 from the carrier 14. More specifically, the decking arm assembly 16 may be positioned such that one or more of its engagement features 50 engage the instrument panel 12 while it is supported on the carrier 14. The decking arm assembly 16 may then support and grasp the instrument panel 12 to secure it to the decking arm assembly 16 to permit it to be removed from the carrier 14.

At 204, the steering shaft assembly 20 is engaged by the decking arm assembly 16. More specifically, the actuator 42 is advanced to position the cradle 44 into engagement with the steering shaft assembly 20. The actuator 42 may be actuated from the retracted position to the advanced position before, after, or at the same time as the engagement features 50 secure the instrument panel 12 to the decking arm assembly 16. Activation of the actuator 42 and/or one or more engagement features 50 may be automated or may be based on a signal from one or more hand controls 52.

At 206, the instrument panel 12 may be lifted from the carrier 14 with the decking arm assembly 16 and positioned in the vehicle 54. The decking arm assembly 16 may translate and rotate as necessary to permit the instrument panel 12 to be inserted through a door opening 116 of the vehicle 54 and into a desired installation position in the vehicle 54. For example, the decking arm assembly 16 may be aligned between the door openings and moved in a vehicle-forward direction to position the instrument panel 12 against the vehicle body. As the instrument panel 12 and decking arm assembly 16 are moved vehicle-forward, at least a portion of the sensor assembly 46, such as the arm 112, may contact the vehicle body. The arm 112 triggers the switch 110 when the instrument panel 12 is in the desired installation location.

At 208, the shaft may be disengaged by moving the actuator 42 at least partially toward the retracted position.

At 210, the instrument panel 12 is at least partially secured to the vehicle 54 prior to the release of the instrument panel 12 from the decking arm assembly 16. The decking arm assembly 16 may then be removed from the vehicle 54.

While the best mode for carrying out the invention has been described in detail, those familiar with the art to which this invention relates will recognize various alternative designs and embodiments for practicing the invention as defined by the following claims.

What is claimed is:

1. A system for carrying an instrument panel for a motor vehicle, the instrument panel including a steering shaft assembly for receiving a steering wheel, the system comprising:
    a decking arm assembly comprising:
        a support structure for supporting the instrument panel;
        an actuator disposed proximate the support structure, the actuator being moveable between an advanced position and a retracted position;
        a cradle disposed proximate the actuator for engaging the steering shaft assembly; and
        a sensor assembly disposed proximate the support structure for detecting the position of the decking arm assembly relative to the motor vehicle, the sensor assembly having an arm that contacts an A-pillar of the motor vehicle when the instrument panel is in a desired installation position;
    wherein the cradle engages the steering shaft assembly when the actuator is in the advanced position and the sensor assembly does not indicate that the instrument panel is in the desired installation position.

2. The system of claim 1 wherein the actuator is moved to the retracted position when the sensor assembly contacts the motor vehicle and indicates that the instrument panel is in the desired installation position.

3. The system of claim 1 wherein the actuator is a pneumatic cylinder.

4. The system of claim 1 wherein the arm is disposed near an end of the support structure.

5. The system of claim 1 wherein the cradle further comprises first and second raised portions disposed generally parallel to each other, the first and second raised portions cooperating to at least partially define a groove for receiving the steering shaft assembly.

6. The system of claim 5 wherein the first and second raised portions are disposed on a face surface disposed at an angle relative to a direction in which the actuator travels between the advanced and retracted positions.

7. The system of claim 5 wherein the first raised portion includes a first surface and the second raised portion includes a second surface, the first and second surfaces being oriented along intersecting planes and cooperating to at least partially define the groove.

8. The system of claim 1 wherein the support structure is mounted to an overhead support track that permits movement of the decking arm assembly.

9. The system of claim 1 wherein the steering shaft assembly includes an intermediate steering shaft having a first end coupled to a steering wheel shaft, the intermediate shaft being engaged by the cradle.

10. The system of claim 1 further comprising a carrier for holding the instrument panel, the carrier having a fixture for positioning the steering shaft assembly in a predetermined location such that the steering shaft assembly is aligned with the carrier when the decking arm assembly receives the instrument panel from the carrier.

11. The system of claim 10 wherein the fixture includes a pin and an end of the steering shaft assembly engages the pin to position the steering shaft assembly in the predetermined portion.

12. The system of claim 1 wherein the cradle further comprises first and second raised portions that cooperate to at least partially define a groove for receiving the steering shaft assembly.

13. The system of claim 1 wherein the sensor assembly contacts an A-pillar of the motor vehicle when the instrument panel is moved forward.

14. The system of claim 1 wherein the decking arm assembly is configured to rotate.

* * * * *

UNITED STATES PATENT AND TRADEMARK OFFICE
CERTIFICATE OF CORRECTION

PATENT NO. : 7,568,279 B2 Page 1 of 1
APPLICATION NO. : 11/161440
DATED : August 4, 2009
INVENTOR(S) : Lohman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Seventh Day of September, 2010

David J. Kappos
*Director of the United States Patent and Trademark Office*